(12) United States Patent
Lo et al.

(10) Patent No.: US 9,361,805 B2
(45) Date of Patent: Jun. 7, 2016

(54) METHOD AND SYSTEM FOR PAGE DETECTION USING LIGHT ATTENUATORS

(71) Applicant: Generalplus Technology Inc., Hsinchu (TW)

(72) Inventors: Li-Shang Lo, Hsinchu County (TW); Tung-Tsai Liao, Hsinchu (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 14/341,088

(22) Filed: Jul. 25, 2014

(65) Prior Publication Data

US 2015/0138554 A1 May 21, 2015

(30) Foreign Application Priority Data

Nov. 21, 2013 (TW) .............................. 102142406 A (51) Int. Cl.
*G01J 4/00* (2006.01)
*G09B 5/00* (2006.01)

(52) U.S. Cl.
CPC ....................... *G09B 5/00* (2013.01)

(58) Field of Classification Search
CPC ........................................................ G09B 5/00
USPC ........................................................ 356/370
See application file for complete search history.

(56) References Cited

U.S. PATENT DOCUMENTS 5,847,846 A * 12/1998 Wu et al. ....................... 358/475
2011/0320208 A1 * 12/2011 Wong ............................. 704/270

* cited by examiner

*Primary Examiner* — Tarifur Chowdhury
*Assistant Examiner* — Omar Nixon
(74) *Attorney, Agent, or Firm* — Bacon & Thomas, PLLC (57) ABSTRACT

A system for page detection using light attenuators is applied in a book to detect an opened page of the book. The book has N pages and each page has a page detection area in which at most M light attenuators are installed in each page detection area. A light source passes through the at most M light attenuators for attenuating intensity of the light source. M light sensing devices are installed in an area of the book that corresponds to the page detection area. The M light sensing devices are used to detect attenuated intensities of the light source. A controller is connected to the M light sensing devices for detecting the opened page based on a ratio of the intensities of the light source detected by the M light sensing devices on each page.

6 Claims, 8 Drawing Sheets

| Page | Intensity |
|---|---|
| 1 | $[I,\ I,\ I]$ |
| 2 | $[\alpha I,\ I,\ I]$ |
| 3 | $[\alpha I \cos^2 \theta_1,\ I,\ I]$ |
| 4 | $[\alpha I \cos^2 \theta_1 \cos^2 \theta_2,\ I,\ I]$ |
| 5 | $[\alpha I \cos^2 \theta_1 \cos^2 \theta_2 \cos^2 \theta_3,\ I,\ I]$ |
| 6 | $[\alpha I \cos^2 \theta_1 \cos^2 \theta_2 \cos^2 \theta_3,\ \alpha I,\ I]$ |
| 7 | $[\alpha I \cos^2 \theta_1 \cos^2 \theta_2 \cos^2 \theta_3,\ \alpha I \cos^2 \theta_1,\ I]$ |
| 8 | $[\alpha I \cos^2 \theta_1 \cos^2 \theta_2 \cos^2 \theta_3,\ \alpha I \cos^2 \theta_1 \cos^2 \theta_2,\ I]$ |
| 9 | $[\alpha I \cos^2 \theta_1 \cos^2 \theta_2 \cos^2 \theta_3,\ \alpha I \cos^2_1 \theta \cos^2_2 \theta \cos^2_3 \theta,\ I]$ |
| 10 | $[\alpha I \cos^2 \theta_1 \cos^2 \theta_2 \cos^2 \theta_3,\ \alpha I \cos^2 \theta_1 \cos^2 \theta_2 \cos^2 \theta_3,\ \alpha I]$ |
| 11 | $[\alpha I \cos^2 \theta_1 \cos^2 \theta_2 \cos^2 \theta_3,\ \alpha I \cos^2_1 \theta \cos^2_2 \theta \cos^2_3 \theta,\ \alpha I \cos^2_1 \theta]$ |
| 12 | $[\alpha I \cos^2 \theta_1 \cos^2 \theta_2 \cos^2 \theta_3,\ \alpha I \cos^2 \theta_1 \cos^2 \theta_2 \cos^2 \theta_3,\ \alpha I \cos^2 \theta_1 \cos^2 \theta_2]$ |

FIG. 5

| Page | Intensity |
|---|---|
| 1 | $[I, I, I]$ |
| 2 | $[\alpha I, I, I]$ |
| 3 | $[\frac{1}{2}\alpha I, I, I]$ |
| 4 | $[\frac{1}{4}\alpha I, I, I]$ |
| 5 | $[\frac{1}{8}\alpha I, I, I]$ |
| 6 | $[\frac{1}{8}\alpha I, \alpha I, I]$ |
| 7 | $[\frac{1}{8}\alpha I, \frac{1}{2}\alpha I, I]$ |
| 8 | $[\frac{1}{8}\alpha I, \frac{1}{4}\alpha I, I]$ |
| 9 | $[\frac{1}{8}\alpha I, \frac{1}{8}\alpha I, I]$ |
| 10 | $[\frac{1}{8}\alpha I, \frac{1}{8}\alpha I, \alpha I]$ |
| 11 | $[\frac{1}{8}\alpha I, \frac{1}{8}\alpha I, \frac{1}{2}\alpha I]$ |
| 12 | $[\frac{1}{8}\alpha I, \frac{1}{8}\alpha I, \frac{1}{4}\alpha I]$ |

FIG. 6

| Page | Intensity |
|---|---|
| 1 | $[I, I, I] = [1, 1, 1]$ |
| 2 | $[\frac{1}{2}I, I, I] = [1, 2, 2]$ |
| 3 | $[\frac{1}{4}I, I, I] = [1, 4, 4]$ |
| 4 | $[\frac{1}{8}I, I, I] = [1, 8, 8]$ |
| 5 | $[\frac{1}{16}I, I, I] = [1, 16, 16]$ |
| 6 | $[\frac{1}{16}I, \frac{1}{16}I, I] = [1, 8, 16]$ |
| 7 | $[\frac{1}{16}I, \frac{1}{4}I, I] = [1, 4, 16]$ |
| 8 | $[\frac{1}{16}I, \frac{1}{8}I, I] = [1, 2, 16]$ |
| 9 | $[\frac{1}{16}I, \frac{1}{16}I, I] = [1, 1, 16]$ |
| 10 | $[\frac{1}{16}I, \frac{1}{16}I, \frac{1}{2}I] = [1, 1, 8]$ |
| 11 | $[\frac{1}{16}I, \frac{1}{16}I, \frac{1}{4}I] = [1, 1, 4]$ |
| 12 | $[\frac{1}{16}I, \frac{1}{16}I, \frac{1}{8}I] = [1, 1, 2]$ |

FIG. 7

FIG. 8

METHOD AND SYSTEM FOR PAGE DETECTION USING LIGHT ATTENUATORS

BACKGROUND OF THE INVENTION

1. Field of the Invention

The present invention relates to the technical field of page detection for a book and, more particularly, to a method and system for page detection using light attenuators.

2. Description of Related Art

Figure 1:
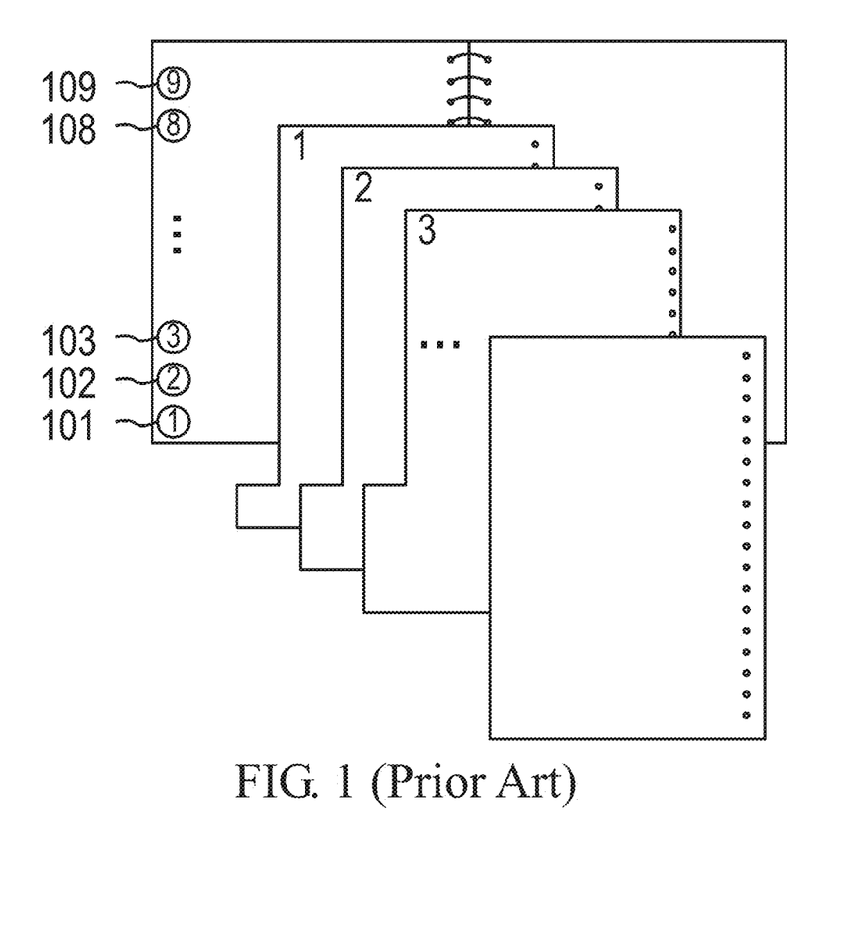
FIG. 1 is a schematic view of a typical optical mask page detection technology.

Electronic books associated with Educational Learning Aids (ELA) generally require page detection technology to play multimedia (such as voice) corresponding to the content on each page of a book. Typical page detection technology usually uses reed switch, color decision, or optical masking decision for page detection, wherein the optical masking decision is relatively cheap FIG. 1 is a schematic view of a typical optical masking page detection technology. The optical masking page detection technology is applied in a 9-page book, with nine sensors 101-109. Each page has a hole defined at a different position of its face, and each page number is decided by a different number of masked light sensors. For example, when the book is turned to the first page, the first light sensor 101 is masked while the remaining light sensors 102-109 are unmasked, and a controller (not shown) is based on the electrical signals from the light sensors 101-109 to decide that it is turned to the first page now. In this case, the controller can play the multimedia information corresponding to the content on the first page.

However, the cited optical mask page detection requires a large number of light sensors in order to achieve the page detection, resulting in a high manufacturing cost. Therefore, it is desirable to provide an improved page detection method and system to mitigate and/or obviate the aforementioned problems.

SUMMARY OF THE INVENTION

The object of the present invention is to provide a method and system for page detection using light attenuators, which can relatively decrease the number of light sensing devices so as to reduce the manufacturing cost.

According to a feature of the present invention, there is provided a system for page detection using light attenuators, which is applied in a book to detect an opened page of the book, wherein the book has N pages and each page has a page detection area, where N is an integer greater than one. The system comprises: a plurality of light sensors in which at most M light attenuators are installed side by side in the page detection area of each of the N pages for allowing an external light source to pass through the at most M light attenuators thereby attenuating an intensity of the external light source, where M is an integer greater than one and M<N; M light sensing devices installed in an area of the book corresponding to the at most M light attenuators so as to detect an attenuated intensity of the light source after the external light passes through the at most M light attenuators; and a controller connected to the M light sensing devices for determining the opened page based on a ratio of the intensities of the light source detected by the M light sensing devices on each page.

According to another feature of the present invention, there is provided a method for page detection using light attenuators, which is applied in a book to detect an opened page of the book, wherein the book has N pages and each page has a page detection area, where N is an integer greater than one. The method comprises the steps of: (A) configuring at most M light attenuators side by side in the page detection area of each of the N pages so as to allow an external light source to pass through the at most M light attenuators for attenuating an intensity of the external light source, where M is an integer greater than one and M<N; (B) using M light sensing devices installed in an area of the book corresponding to the at most M light attenuators to detect an attenuated intensity of the external light source; (C) using a controller to detect the opened page based on a ratio of the intensities of the external light source detected by the M light sensing devices on each page.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
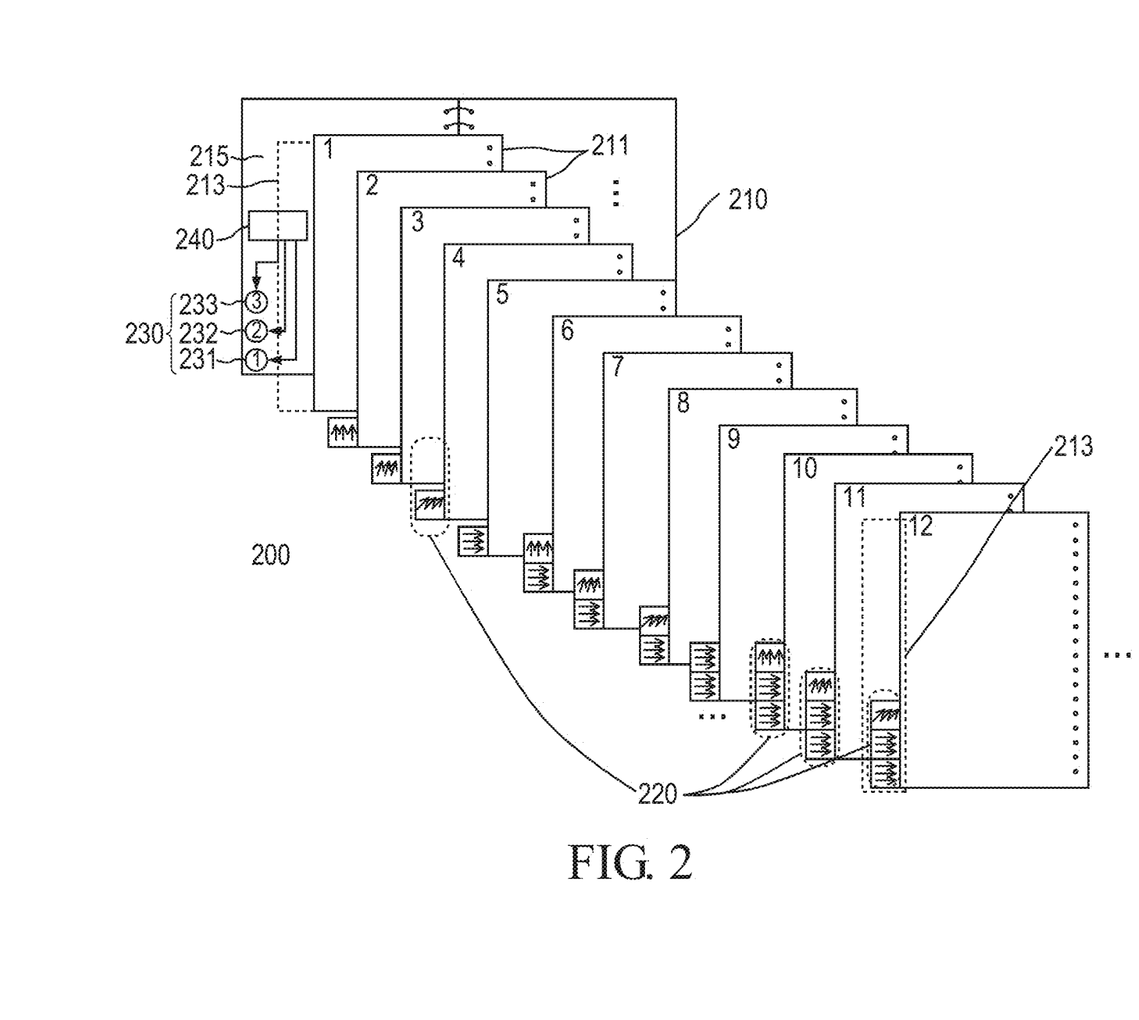
FIG. 2 is a schematic view of a system for page detection using light attenuators according to the invention.

FIG. 2 is a schematic view of a system 200 for page detection using light attenuators according to the invention. The system 200 is applied in a book 210 to detect an opened page of the book 210. The book 210 has N pages, where N is an integer greater than one. Each page 211 has a page detection area 213. The system 200 includes a plurality of light attenuators 220 in which at most M light attenuators 220 are installed side by side in the page detection area 213 of each of the N pages; M light sensing devices 230; and a controller 240. The page detection area 213 can be arranged on the outer, inner, upper, or lower edge of the page 211, or an appropriate area of the page 211. In this embodiment, the page detection area 213 is arranged on the outer edge of the page 211 for convenient description.

The at most M light attenuators 220 are installed in the page detection area of each of the N pages so that an external light source (not shown), for example a lamplight in a house, a predetermined lamplight, or an outdoor natural light, passes through the at most M light attenuators 220 for attenuating the intensity of the external light source, where M is an integer greater than one and M<N and, in this embodiment, N=12 and M=3. As shown in FIG. 2, at most three light attenuators 220 are installed side by side on each of the first to twelfth pages. Specifically, there is no light attenuator 220 installed (zero light attenuator 220 installed) on the first page, there is one light attenuator 220 installed on each of the second to fifth pages, there are two light attenuators 220 installed side by side on each of the sixth to ninth pages, and there are three light attenuators 220 installed side by side on each of the tenth to twelfth pages.

The M light sensing devices 230 are installed side by side in an area of the book 210 that corresponds to the at most M light attenuators 220 in order to detect the attenuated intensity of the external light source passed through the at most M light attenuators 220. As shown in FIG. 2, three light sensing devices 231, 232, 233 are installed side by side in the inside front cover 215 of the book 210 that corresponds to the at most three light attenuators 220 of each page 211. Thus, when a page 211 is turned over, the external light source is attenuated by a different number of light attenuators 220, and the three light sensing devices 230 receive different attenuated intensities.

Specifically, when it is turned to the first page of the pages 211, there is no light attenuator 220 employed to attenuate the external light source, so that the three light sensing devices 231, 232, 233 receive non-attenuated intensity. When it is turned to the second page of the pages 211, the light attenuator 220 of the second page attenuates the external light source, so that the light sensing device 231 receives a corresponding attenuated intensity while the light sensing devices 232, 233 receive non-attenuated intensities. When it is turned to the third page of the pages 211, the light attenuators 220 of the second and third pages are overlapped to attenuate the external light source, so that the light sensing device 231 receive a corresponding attenuated intensity while the light sensing devices 232, 233 receive non-attenuated intensities. When it is turned to the fourth page of the pages 211, the light attenuators 220 of the second, third and fourth pages are overlapped to attenuate the external light source, so that the light sensing device 231 receives a corresponding attenuated intensity while the light sensing devices 232, 233 receive non-attenuated intensities. When it is turned to the fifth page for the pages 211, the light attenuators 220 of the second to fifth pages are overlapped to attenuate the external light source, so that the light sensing device 231 receives a corresponding attenuated intensity while the light sensing devices 232, 233 receive non-attenuated intensities.

When it is turned to the sixth page of the pages 211, the light attenuators 220 of the second to fifth pages and the first (the bottommost) light attenuator 220 of the sixth page are overlapped to attenuate the external light source, and the second (the topmost) light attenuator 220 of the sixth page attenuates the external light source, so that the relative light sensing devices 231, 232 receive corresponding attenuated intensities while the light sensing device 233 receives non-attenuated intensity. When it is turned to the seventh page of the pages 211, the light attenuators 220 of the second to fifth pages and the first (the bottommost) light attenuators 220 of the sixth and seventh pages are overlapped to attenuate the external light source, and the second (the topmost) light attenuators 220 of the sixth and seventh pages are overlapped to attenuate the external light source, so that the relative light sensing devices 231, 232 receive corresponding attenuated intensities while the light sensing device 233 receives non-attenuated intensity. When it is turned to the eighth page of the pages 211, the light attenuators 220 of the second to fifth pages and the first (the bottommost) light attenuators 220 of the sixth, seventh, and eighth pages are overlapped to attenuate the external light source, and the second (the topmost) light attenuators 220 of the sixth, seventh, and eighth pages are overlapped to attenuate the external light source, so that the relative light sensing devices 231, 232 receive corresponding attenuated intensities while the light sensing device 233 receives non-attenuated intensity. When it is turned to the ninth page of the pages 211, the light attenuators 220 of the second to fifth pages and the first (the bottommost) light attenuators 220 of the sixth to ninth pages are overlapped to attenuate the external light source, and the second (the topmost) light attenuators 220 of the sixth to ninth pages are overlapped to attenuate the external light source, so that the relative light sensing devices 231, 232 receive corresponding attenuated intensities while the light sensing device 233 receives non-attenuated intensity.

When it is turned to the tenth page of the page 211, the light attenuators 220 of the second to fifth pages and the first (the bottommost) light attenuators 220 of the sixth to tenth pages are overlapped to attenuate the external light source, the second (the topmost) light attenuators 220 of the sixth to ninth pages and the second (the middle) light attenuator 220 of the tenth page are overlapped to attenuate the external light source, and the third (the topmost) light attenuator 220 of the tenth page attenuates the external light source, so that the relative light sensing devices 231, 232, 233 receive corresponding attenuated intensities. When it is turned to the eleventh page of the pages 211, the light attenuators 220 of the second to fifth pages and the first (the bottommost) light attenuators 220 of the sixth to eleventh pages are overlapped to attenuate the external light source, the second (the topmost) light attenuators 220 of the sixth to ninth pages and the second (the middle) light attenuators 220 of the tenth and eleventh pages are overlapped to attenuate the external light source, and the third (the topmost) light attenuators 220 of the tenth and eleventh pages are overlapped to attenuate the external light source, so that the relative light sensing devices 231, 232, 233 receive corresponding attenuated intensities. When it is turned to the twelfth page of the page 211, the light attenuators 220 of the second to fifth pages and the first (the bottommost) light attenuators 220 of the sixth to twelfth pages are overlapped to attenuate the external light source, the second (the topmost) light attenuators 220 of the sixth to ninth pages and the second (the middle) light attenuators 220 of the tenth, eleventh and twelfth pages are overlapped to attenuate the external light source, and the third (the topmost) light attenuators 220 of the tenth, eleventh and twelfth pages are overlapped to attenuate the external light source, so that the relative light sensing devices 231, 232, 233 receive corresponding attenuated intensities.

The at most M light attenuators 220 each can be a polarizer or a translucent plastic sheet to attenuate the intensity of the external light source. If the at most M light attenuators 220 are each a polarizer, the polarizer is a color glass paper. The M light sensing devices 230 each can be a light sensor, a photodiode, or a light emitting diode.

The controller 240 is connected to the M light sensing devices 230 for detecting the opened page of the book 210 based on the intensities of the external light source detected by the M light sensing devices 230.

Since light is an electromagnetic wave, the vibrating direction of magnetic and electric fields of the electromagnetic wave is vertical to the propagating direction thereof. When the vibrating direction of electric field of the light is specific, the light is referred to as a polarized light. By allowing light to pass through a polarizing sheet, it is able to obtain a polarization at a specific direction. This is because the polarizing sheet only allows the waves vibrating in the same axial direction therewith to pass through.

Figure 3:
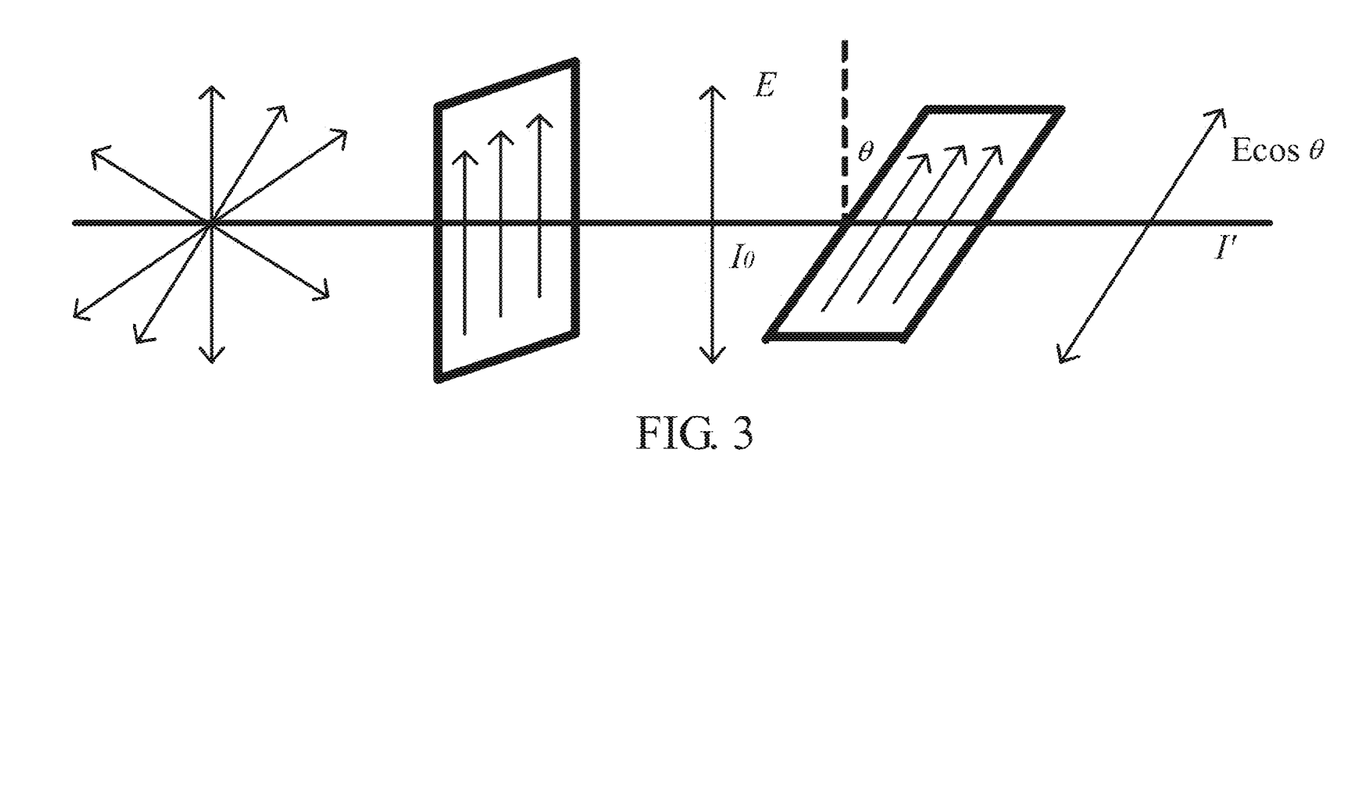
FIG. 3 is a schematic view of a light passing through a polarizing sheet according to the invention.

Typically, natural light or lamplight is a non-polarized light. Such non-polarized light may become a polarized light after passing through a polarizing sheet and its polarizing direction (i.e., the direction of the electric field) can be obtained from a mark on the polarizing sheet. FIG. 3 is a schematic view of a light passing through a polarizing sheet. As shown in FIG. 3, when the polarized light further passes through a polarizing sheet, the amplitude of its electric field is attenuated by a multiple of cos θ, where θ indicates an included angle between the polarized light and the polarizing sheet. As shown in FIG. 3, since the light intensity is positively proportional to a square of the intensity of the electric field, the intensity of the light after passing through the polarizing sheet is equal to the incident intensity multiplied by cos θ, which can be expressed as:

$$I' = I_0 \cos^2 \theta,$$

where I' indicates the light after passing through a polarizing sheet, and $I_0$ indicates the light before passing through a polarizing sheet.

Figure 4:
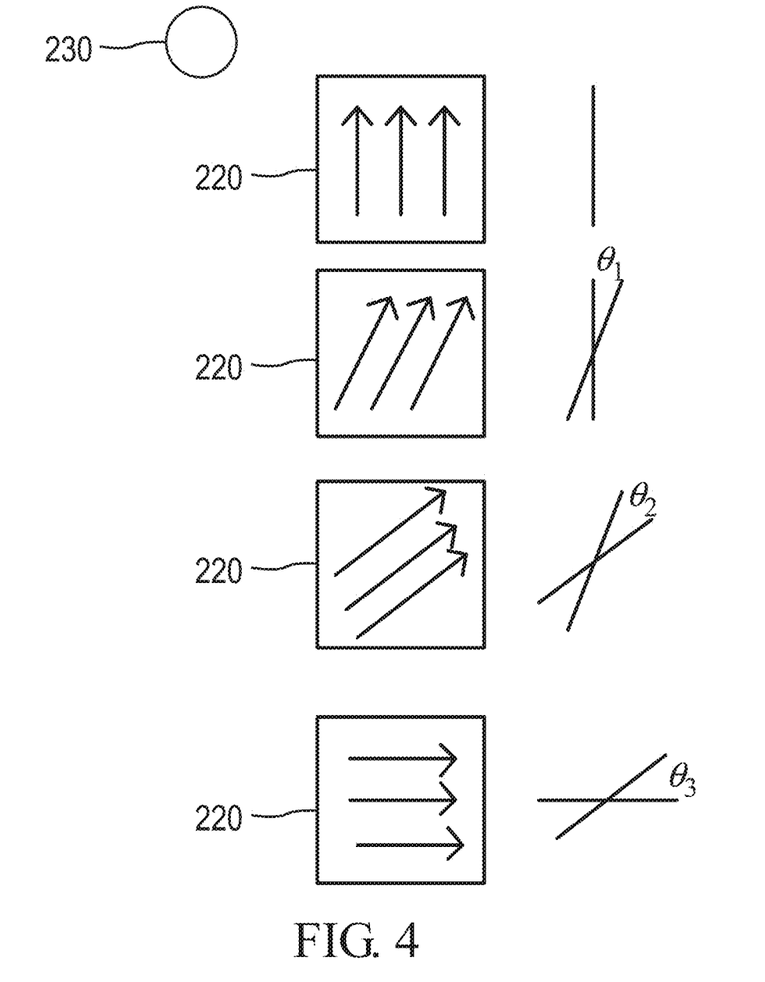
FIG. 4 is a schematic view of using multiple polarizing sheets for page detection according to the invention.

FIG. 4 is a schematic view of using multiple polarizing sheets to attenuate intensity of light according to the invention. If the intensity of light is set to I and after the light passes through a first polarizing sheet, the intensity of the light becomes αI, where α indicates a light attenuation coefficient. Next, after the light passes through a second polarizing sheet, the intensity of the light becomes $\alpha I \cos^2 \theta_1$. Then, after passing a third polarizing sheet, the intensity of the light becomes $\alpha I \cos^2 \theta_1 \times \cos^2 \theta_2$. Finally, after passing a fourth polarizing sheet, the intensity of the light becomes $\alpha I \cos^2 \theta_1 \times \cos^2 \theta_2 \times \cos^2 \theta_3$. Accordingly, with the use of four polarizing sheets, five different light intensities can be obtained.

As shown in FIG. 2, there are three light sensing devices 230 (231, 232, 233). When the book is turned to the first page, because the first page does not have any light attenuator 220 installed, the three light sensing devices 230 receive light intensities of [I, I, I]. When it is turned to the second page, because the second page is installed with one light attenuator 220, the three light sensing devices 230 receive light intensities of [αI, I, I]. Similar operations can be applied to the book that is turned to the other pages, and thus a detailed description is deemed unnecessary.

Figure 5:
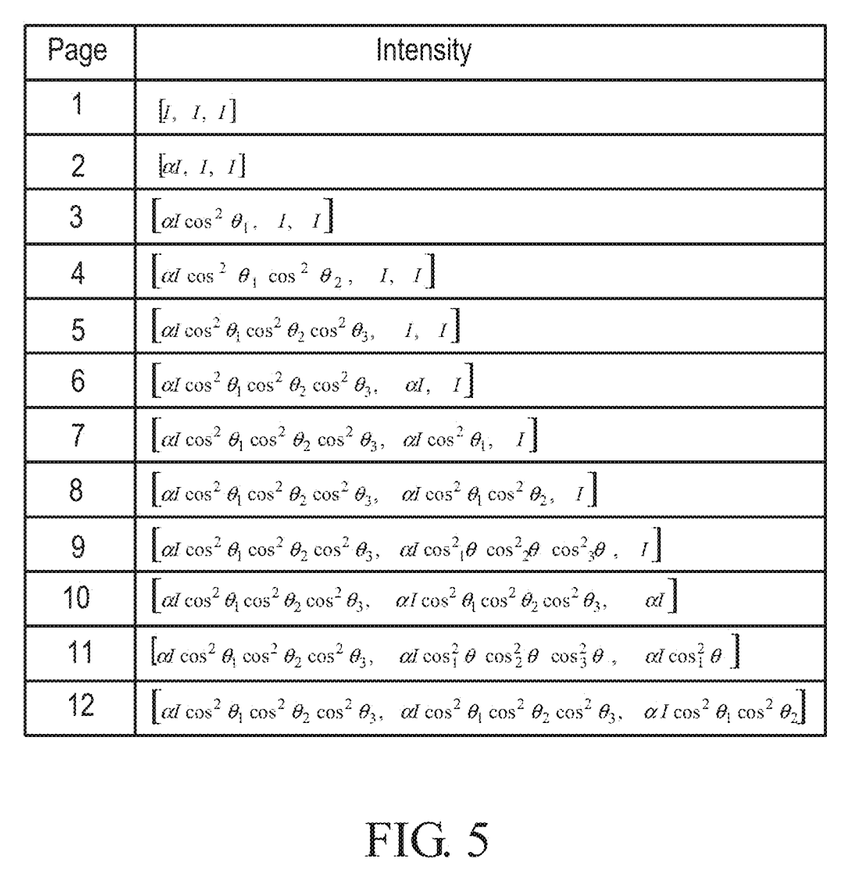
FIG. 5 is a schematic view of an attenuated intensity of the light source on each page according to the invention.
Figure 6:
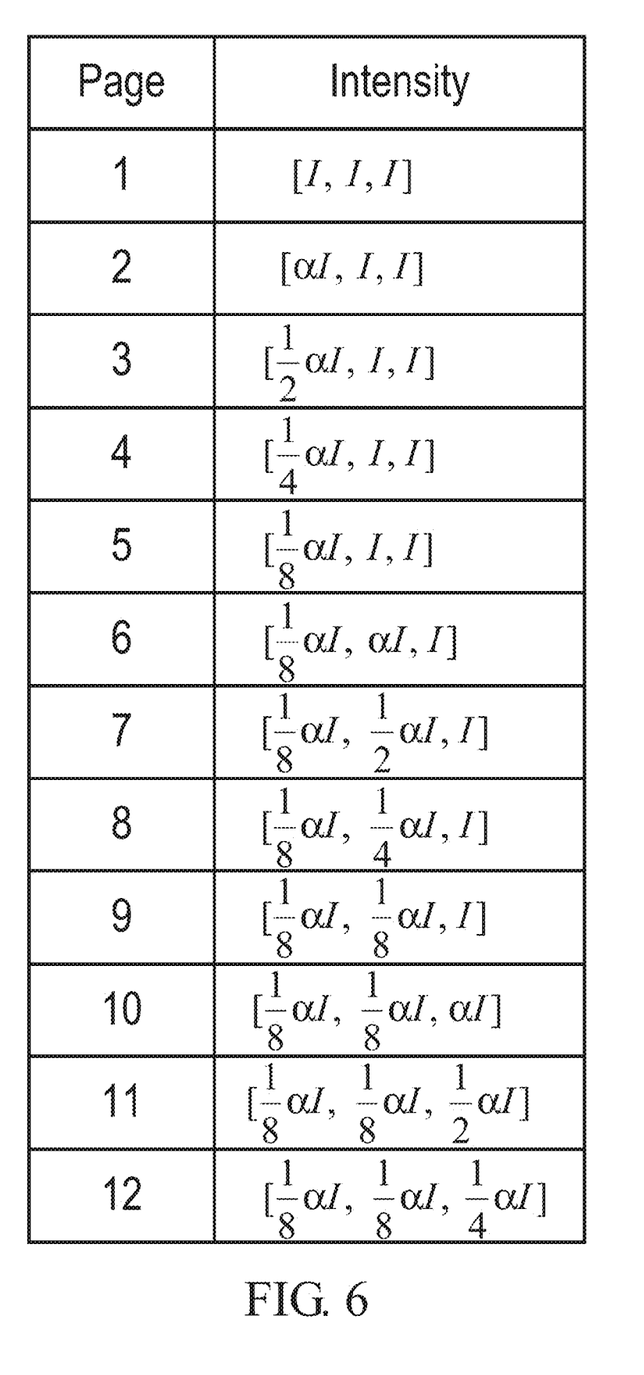
FIG. 6 is another schematic view of an attenuated intensity of the light source on each page according to the invention.

FIG. 5 is a schematic view of received intensity of the light source on each page according to the invention. FIG. 6 is another schematic view of received intensity of the light source on each page according to the invention, which indicates the received intensities of each page when $\theta_1$, $\theta_2$ and $\theta_3$ are each 45°.

Figure 7:
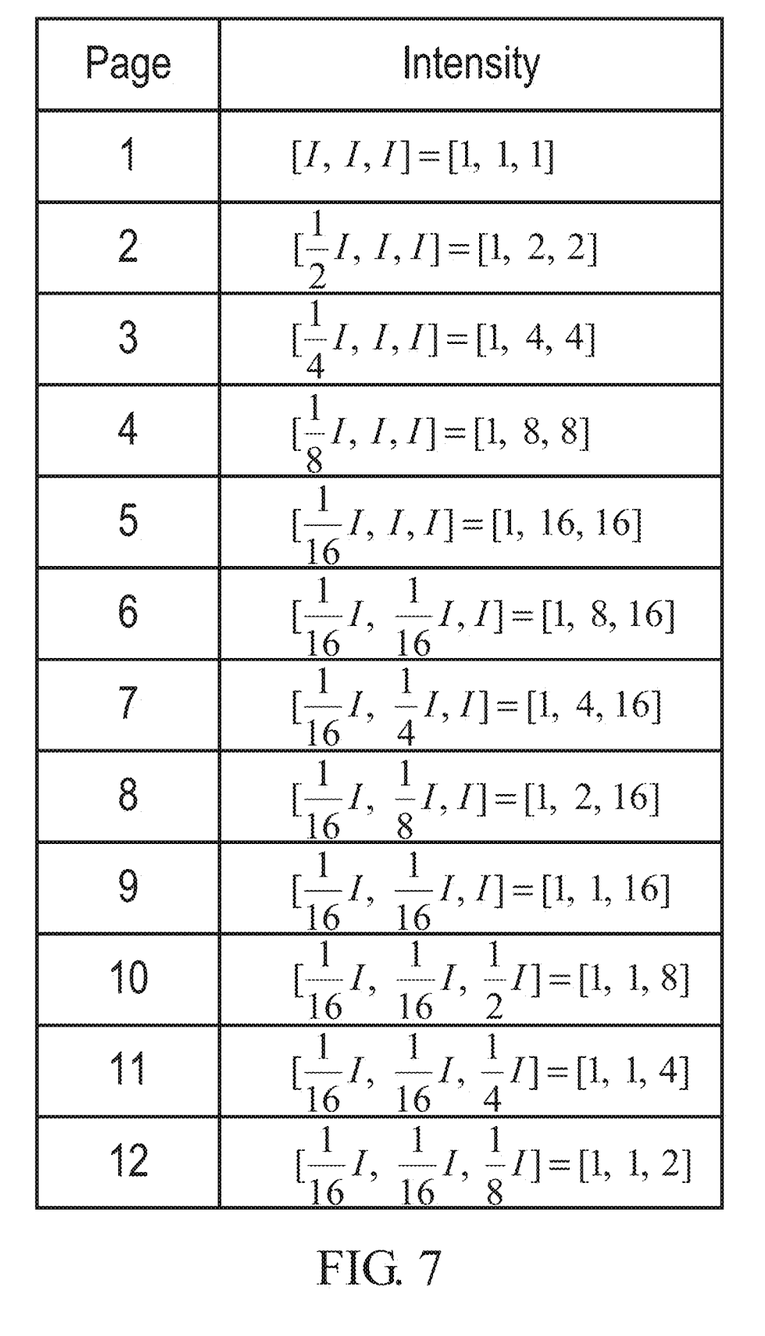
FIG. 7 is a further schematic view of an attenuated intensity of the light source on each page according to the invention.

Typically, the light attenuation coefficient α is about ½. In addition, upon the purpose and material transmittance, the polarization coefficient can be up to 99.9%. Thus, the received intensity of each page of FIG. 6 can be further demonstrated in FIG. 7. FIG. 7 is a further schematic view of received intensity of the light source on each page according to the invention, which indicates the received intensities of each page when $\theta_1$, $\theta_2$ and $\theta_3$ are each 45°, and α is about ½.

From the ratio of received intensities of the light source on each page in FIG. 7, it is known that the controller 240 can detect the opened page of the book 210 based on the ratio of received intensities of the light source without accurately measuring the intensity. Thus, the low-cost M light sensing devices 230 can be used for page detection. The M light sensing devices can be conventional light sensors or photodiodes, or even light-emitting diodes (LEDs). Since the polarization feature depends on different wavelength, an infrared (IR) LED can be used as a light sensor to alleviate the problem in that the polarization feature varies due to different wavelength.

Typically, the induced photocurrent is positively proportional to the intensity of light. It is known from FIG. 7 that the controller 240 can use a simple shift operation in computation to achieve the purpose so as to eliminate the requirement of using multipliers and dividers. Thus, the controller 240 can be a simple microcontroller. Further, with reference to the proportion relation of the M light sensing devices 230, it is able to calculate the currently opened page. With such a configuration, three light sensing devices 230 can be used to achieve the application of detecting twelve pages.

In this embodiment, the twelve pages (N=12) and three light attenuators (M=3) are used as an example for illustrative purpose only, but not limited to it, and those skilled in the art can change the values of N and M as long as the M light sensing devices 230 can detect the N pages based on the ratio of received intensity of the light source, for example, nine pages and two light attenuators (N=9, M=2, the first page being installed with no light attenuator, each of the second to fifth pages being installed with one light attenuator, each of the sixth through ninth pages being installed with two light attenuators side by side), or five pages and one light attenuator (N=5, M=1, the first page being installed with no light attenuator, each of the second to fifth pages being installed with one light attenuator).

Figure 8:
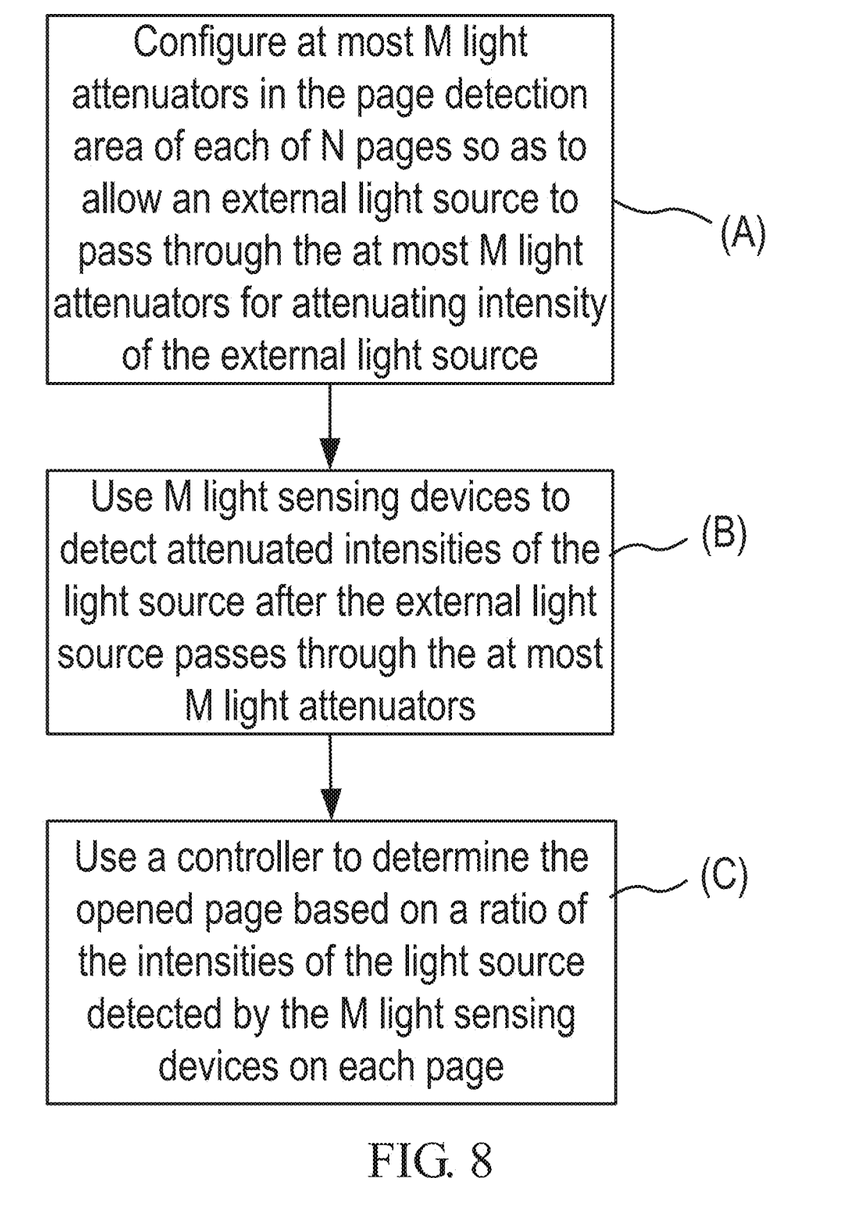
FIG. 8 is a flowchart of a method for page detection using light attenuators according to the invention.

FIG. 8 is a flowchart of a method for page detection using light attenuators according to the invention, which is applied in a book to detect an opened page of the book. As shown in FIGS. 2 and 8, in the system 200 for page detection using light attenuators, the book has N pages, where N is an integer greater than one, and each page has a page detection area 213. The method first performs a step (A) of configuring at most M light attenuators 220 in the page detection area 213 of each of the N pages 211 in order to allow an external light source to pass through the at most M light attenuators 220 for attenuating an intensity of the external light source, where M is an integer greater than one and M<N.

In step (B), M light sensing devices 230 are used to detect attenuated intensities of the light source after the external light source passes through the at most M light attenuators 220. The M light sensing devices 230 are installed in an area of the book that corresponds to the at most M light attenuators 220.

In step (C), a controller 240 is used to detect the opened page based on the attenuated intensities of the light source detected by the M light sensing devices 230.

In view of the foregoing, it is known that the invention uses the combination of polarization effects to achieve the page detection. As compared with the optical masking detection in the prior art, the invention can greatly reduce the number of sensors required, so as to lower the manufacturing cost.

Although the present invention has been explained in relation to its preferred embodiment, it is to be understood that many other possible modifications and variations can be made without departing from the spirit and scope of the invention as hereinafter claimed.

What is claimed is:

1. A system for page detection using light attenuators, which is applied in a book to detect an opened page of the book, wherein the book has N pages and each page has a page detection area, where N is an integer greater than one, the system comprising:

at most M light attenuators installed side by side in the page detection area of each of the N pages for allowing an external light source to pass through the at most M light attenuators thereby attenuating intensity of the external light source, where M is an integer greater than one and M<N;

M light sensing devices installed in an area of the book corresponding to the at most M light attenuators so as to detect attenuated intensities of the light source after the external light passes through the at most M light attenuators; and a controller connected to the M light sensing devices for determining the opened page based on a ratio of the intensities of the light source detected by the M light sensing devices on each page, wherein the at most M light attenuators are each a polarizer, and each of the at most M light attenuators has a different polarization angle for attenuating the intensity of the external light source according to the polarization angle.

2. The system as claimed in claim 1, wherein the polarizer is a color glass paper.

3. The system as claimed in claim 1, wherein the M light sensing devices are each a light sensor or a photodiode.

4. A method for page detection using light attenuators, which is applied in a book to detect an opened page of the book, wherein the book has N pages and each page has a page detection area, where N is an integer greater than one, the method comprising the steps of:

(A) configuring at most M light attenuators side by side in the page detection area of each of the N pages so as to allow an external light source to pass through the at most M light attenuators for attenuating intensity of the external light source, where M is an integer greater than one and M<N, wherein the at most M light attenuators are each a polarizer and each of the at most M light attenuators has a different polarization angle for attenuating the intensity of the external light source according to the polarization angle;

(B) using M light sensing devices installed in an area of the book corresponding to the at most M light attenuators to detect attenuated intensities of the external light source; and (C) using a controller to detect the opened page based on a ratio of the intensity of the external light source detected by the M light sensing devices on each page.

5. The method as claimed in claim 4, wherein the polarizer is a color glass paper.

6. The system as claimed in claim 4, wherein the M light sensing devices are each a light sensor or a photodiode.

* * * * *